United States Patent [19]

Chahroudi

[11] Patent Number: 5,198,922
[45] Date of Patent: Mar. 30, 1993

[54] SPECULARLY TRANSMITTING AND DIFFUSE REFLECTING OPTICAL SHUTTER

[76] Inventor: Day Chahroudi, P.O. Box 497, Placitas, N. Mex. 87043

[21] Appl. No.: 670,784

[22] Filed: Mar. 19, 1991

[51] Int. Cl.$^5$ .................. G02B 26/00; G02B 27/00; G02B 5/02; B05D 5/06

[52] U.S. Cl. .................... 359/290; 359/594; 359/599; 359/609; 427/165

[58] Field of Search ............ 350/259, 261, 262, 264, 350/276 R, 276 SL, 359, 360; 359/591, 592, 594, 595, 597, 290, 599, 609, 229; 427/163, 162, 165

[56] References Cited

U.S. PATENT DOCUMENTS

| | | | |
|---|---|---|---|
| 1,748,587 | 2/1930 | Smedley | 359/591 |
| 2,275,602 | 3/1942 | Beck et al. | 359/599 |
| 3,185,034 | 5/1965 | Youngblood, Jr. | 359/595 |
| 3,255,665 | 6/1966 | Weiher et al. | 350/262 |
| 3,393,034 | 7/1968 | Imai | 350/276 R |
| 3,527,151 | 9/1970 | Harrison | 359/599 |
| 3,953,310 | 4/1976 | Chahroudi . | |
| 4,085,999 | 4/1978 | Chahroudi . | |
| 4,264,140 | 4/1981 | Harrison, deceased et al. | 359/592 |
| 4,307,942 | 12/1981 | Chahroudi . | |
| 4,734,295 | 3/1988 | Liu | 427/165 |

FOREIGN PATENT DOCUMENTS 1592103 6/1970 France .................... 350/276 R

OTHER PUBLICATIONS

Smay, *Thinking window can switch off the sun*, Popular Science, Mar. 1984.
Chahroudi, *Contractor Designed Passive Heating, Cooling, and Daylighting*, U.S. Passive Solar Conference, Alburquerque, N.M., Mar. 19, 1990.

*Primary Examiner*—Bruce Y. Arnold
*Assistant Examiner*—Evelyn A. Lester
*Attorney, Agent, or Firm*—Willian Brinks Olds Hofer Gilson & Lione

[57] ABSTRACT

A diffuse reflecting and specularly transmitting optical shutter structure comprises an optically rough layer of an optically thin optical shutter, and two additional layers disposed on either side of the optical shutter. These two additional layers have refractive indices which approximately match. The surfaces of these two additional layers adjacent to the optical shutter conform to the optically rough surfaces of the optical shutter and the non-adjacent surfaces to the optical shutter of these two additional layers are optically smooth.

13 Claims, 2 Drawing Sheets

SPECULARLY TRANSMITTING AND DIFFUSE REFLECTING OPTICAL SHUTTER

BACKGROUND OF THE INVENTION

The present invention relates to an optical shutter structure and more particularly diffuse a reflecting optical shutter structure. Optical shutters are a layer or layers which have variable light transmission.

Optical shutters may be a layer or layers covering an aperture. The shutter may be reversibly activated by: (1) its local temperature (thermochromic); (2) incident light intensity (photochromic); (3) both temperature and light (thermophotochromic); or (4) an electric current or field (electrochromic). The combination of transparent insulations with a layer of thermochromic optical shutter is the subject of U.S. Pat. Nos. 4,085,999 and 3,953,110 by the applicant herein. Thermochromic and thermophotochromic shutters, not in combination with a transparent insulation, are the subject of U.S. Pat. No. 4,307,942 and U.S. patent application Ser. No. 06/948,039 ("'039 application") by the applicant herein entitled "Structure and Preparation of Automatic Light Valves," filed on Dec. 31, 1986. Further, my U.S. Pat. No. 4,307,942 and my '039 patent application describes "cloud gel", which reflects through inhomogeneous dielectrics. See also, "Thinking Window switches Off the Sun When it is Hot", Popular Science, March, 1984, and my article "Contractor Designed Passive Heating, Cooling, and Daylighting", U.S. Passive Solar Conference (March 1990).

To best understand the invention, reference is made to the *Encyclopedia of Science & Technology*, Second Edition, McGraw Hill (1989) for a general definition of terms. Specifically, reference is made to *Large Area Chromogenics*, edited by C. M. Lampert, SPIE Optical Engineering Press (1988); *Optical Materials Technology of Energy, Efficiency and Solar Energy Conversion*, edited by C. G. Granqvist, Vol. 9 (1990), Vol. 8 (1989), Vol. 7 (1988); *Material & Optics for Solar Energy Conversion and Advanced Lighting Technology*, edited by C. M. Lampert, SPIE Optical Engineering Press (1986). These publications set forth a comprehensive overview of technology related to this invention.

The reflectance of some optical shutters is primarily specular. Specular reflectance is objectionable in some applications; for example, domestic windows where people do not want to see their reflections mirrored in the windows from either inside or outside the home.

This problem can be overcome by forming the the optical shutter element of the optical shutter structure on or onto a layer with an optically rough surface, and then forming another layer on or onto the optical shutter whose refractive index approximately matches that of the layer with a rough surface, and whose surface not contiguous with the shutter is smooth, as shown in FIGS. 1 and 2.

None of the patents and patent applications described above provides the important advantage of transmitting light specularly but reflecting it diffusely. In other words a person looking through this improved shutter optical would see through it clearly whether the shutter optical were in its transmissive or reflective mode, but this person would not see any clear reflections in the shutter in either mode. The specular transmission of light is accomplished by forming the optical shutter element of the optical shutter structure on or onto a layer with a rough surface, and then forming another layer on or onto the shutter whose refractive index approximately matches that of the layer with a rough surface, and whose surface not contiguous with the shutter is smooth. In this manner, objectionable specular reflectance is eliminated.

SUMMARY OF THE INVENTION

According to the invention, a diffuse reflecting optical shutter structure comprises a rough layer of optical shutter and two layers contiguous disposed on each side of the optical shutter. These two layers have approximately matching refractive indices. The surfaces of these two layers which are adjacent to the optical shutter conforming to optically rough surfaces of the optical shutter, and the nonadjacent surfaces to the optical shutter are optically smooth. The invention itself, together with further objects and attendant advantages, will best be understood by reference to the following detailed description taken in conjunction with the accompanying drawings.

DETAILED DESCRIPTION OF THE INVENTION

To better understand the detailed description, the following definitions are used throughout this application.

An "optically smooth" surface is one where the surface irregularities are smaller than a wavelength of the light in question. Thus, the photon "sees" the surface as a single smooth surface and is not deflected by local surface variations. An optically smooth surface transmits and reflects a clear image.

An "optically rough" surface is one where a parallel stream of photons, or a collimated beam, is scattered, either in reflection or transmission, so that the leaving photons are not completely parallel and the beam is not completely collimated. Such a surface has properties such as orientation which vary on a scale greater than a wavelength of the light in question. An optically rough surface transmits and reflects an image whose "fuzziness" or lack of "focus" varies in proportion to the roughness of the surface. With an optically very rough surface, there is no image transmitted or reflected at all.

The spatial frequency of the roughness of the surface should be greater than the thickness of the reflective layer of the shutter, so that the whole layer appears rough to the incoming light.

While passing through a local element of the optical shutter, which is disposed at some arbitrary angle, and which does not have the same refractive index as its adjacent layers, a beam of light will be slightly deflected and thrown out of focus in proportion to the thickness of the shutter layer. An "optically thin" layer, when referring to the optical shutter, means that the light which is reflected and transmitted by the optical shutter is not deflected (or made less collimated) more than is acceptable for the use in question.

Figure 1:
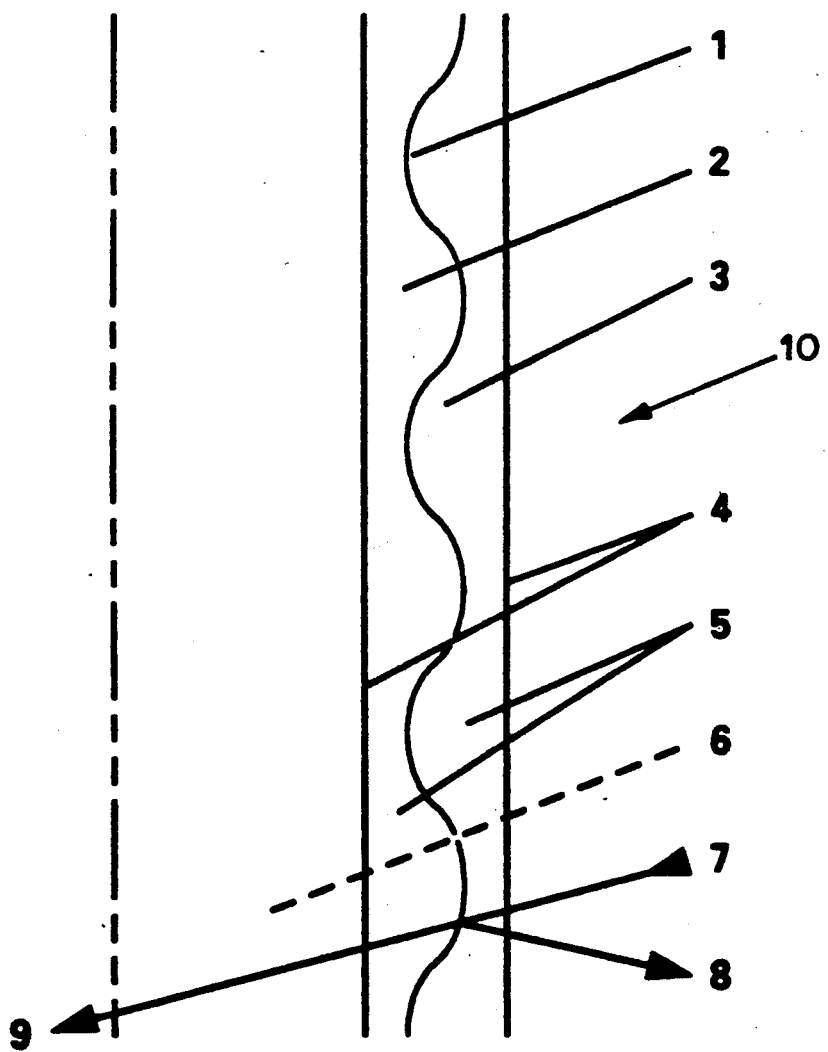
FIG. 1 shows an embodiment illustrating the optical shutter structure in accordance with the present invention.
Figure 2:
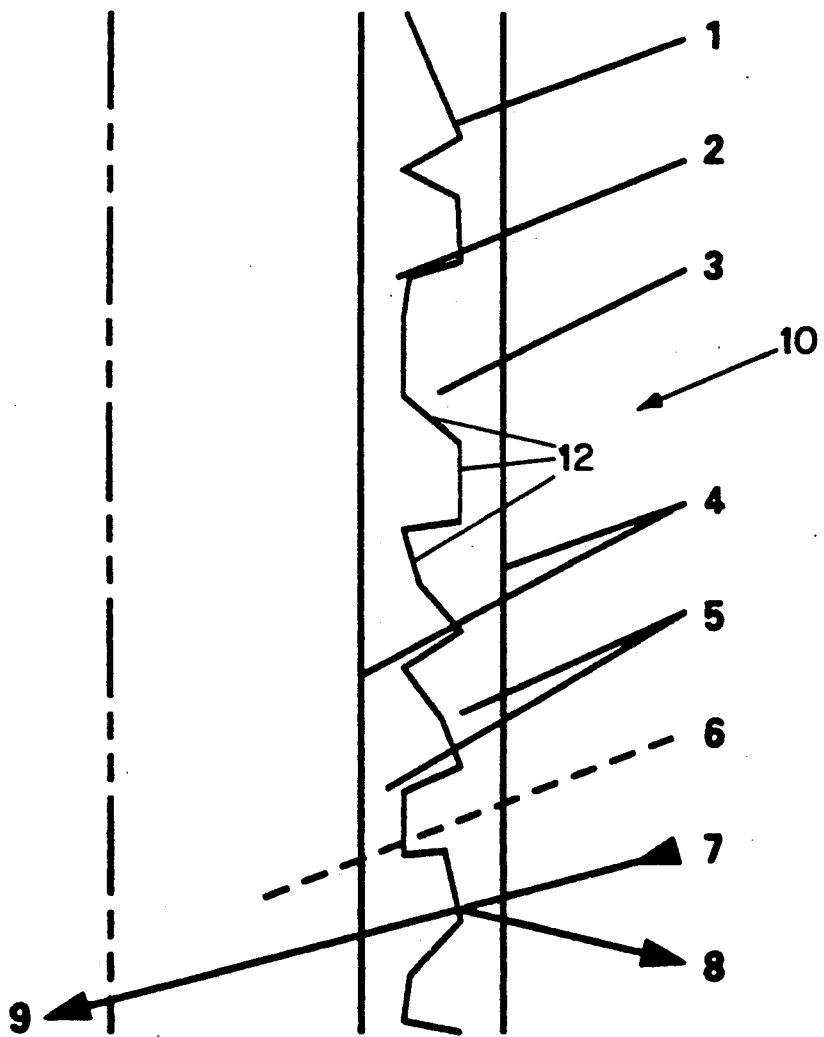
FIG. 2 shows an alterative embodiment illustrating the optical shutter structure in accordance with the present invention.

Turning now to the drawings, FIGS. 1 and 2 show an optical shutter structure 10 comprising a three layer composite layer comprising an optically thin optical shutter. 1 and two layers 2,3 disposed on either side of the optical shutter 1. The refractive indices (illustrated by numeral 5) of the two layers 2,3 contiguous with the optical shutter 1 approximately match, i.e., defined to be within 0.20.

Since the outer surfaces 4 of this composite "layer" are smooth and since the optical shutter 1 is optically thin, a ray of light 7 passing through 9 this structure will not be significantly deflected. Thus, the shutter 1 transmits specularly.

However, when the optical shutter 1 is in its reflective mode, light will be reflected, as shown by numeral 8, by the layer of the shutter 1 alone, not by the composite "layer" composed of the shutter 1 and its two contiguous layers 2,3.

Light 7 will be reflected by the optically rough layer 1, but transmitted by an optically smooth layer which is a composite of three layers 1, 2 and 3. Thus, light 7 will be transmitted specularly but reflected diffusely. In other words, a person looking through this improved optically shutter structure 10 would see through it clearly whether the shutter structure 10 were in its transmissive or reflective mode, but this person would not see any clear reflections in the shutter in either mode.

Merely by way of example, a ground glass screen is frequently used in optics as a rough surface. Commercially available polyethylene terephthalate (PET) plastic films are chemically etched with a solvent while "ground" glass is etched with an acid.

In other examples, an optically rough surface may be prepared by sandblasting or by the crystallization of a polymer, inorganic salt, or organic compound on a transparent substrate as shown by numeral 6, such as glass or a plastic film or sheet.

Preparation of an example of this invention may be as follows: A sheet of etched (optically rough on one side) glass has a multilayer thin film optical shutter vacuum deposited on its rough side using deposition parameters according to the previous references. The shutter is then overcoated with a polystyrene lacquer which dries with a smooth outer surface. The refractive indicia of the glass and the polystyrene are about the same. Thus, the three layer stack of glass/shutter/polystyrene has optically smooth outer surfaces, yet these surfaces encapsulate a shutter layer which is optically rough.

Alternately, instead of a lacquer as above, a smooth surface can be made by coating with emulsions, dispersions, suspensions, fluidized bed, electrostatic spray, etc. The coating material may be polymer, glass, organic in liquid or airborne particles, or inorganic, but it must melt at a lower temperature than the rough surface or the shutter because the coated particles must be heated above their melting points in order to form a smooth surface.

Variations on the embodiments described above are possible. For example, as shown in FIG. 2, the optical shutter 1 may comprise facets 12 forming a "zig-zag" cross section type structure, as contrasted to the smoother harmonic shape illustrated in FIG. 1.

The embodiments described above provide a significant advantage by transmitting light specularly but reflecting it diffusely. In other words a person looking through this improved optical shutter structure would see through it clearly whether the optical shutter were in its transmissive or reflective mode, but this person would not see any clear reflections in the shutter in either mode. As is apparent, the improved optical shutter structure may be used for windows and other architectural applications.

Of course, it should be understood that a wide range of changes and modifications can be made to the embodiment described above. It is therefore intended that the foregoing detailed description be understood that it is the following claims, including all equivalents, which are intended to define the scope of this invention.

I claim:

1. A diffuse reflecting and specularly transmitting optical shutter structure comprising an optically rough layer of optical shutter, and two layers having surfaces disposed on either side of the optical shutter with refractive indices which approximately match the refractive index of the optical shutter, the layer surfaces adjacent to the optical shutter conforming to the optically rough surfaces of the optical shutter and the layer surfaces non-adjacent to the optical shutter being optically smooth.

2. The invention of claim 1, wherein said optical shutter defines a harmonic shape surface.

3. The invention of claim 2, wherein said optical shutter defines facets forming a surface with a zig-zag cross-section.

4. The invention of claim 1, wherein said optically rough surface defines an etched surface.

5. The invention of claim 4, wherein the optically rough surface includes a solvent etched polymer.

6. The invention of claim 4, wherein the optically rough surface includes an acid etched glass.

7. The invention of claim 1, wherein the optically rough surface includes a crystallized material.

8. The invention of claim 1, wherein the optically rough surface defines an abraded surface.

9. The invention of claim 1, wherein one of the two layers on either side of the optical shutter includes a solvent based polymer coating thereby forming an optically smooth surface.

10. The invention of claim 1, wherein one of the two layers on either side of the optical shutter includes melted liquid borne particles thereby forming an optically smooth surface.

11. The invention of claim 1, wherein one of the two layers on either side of the optical shutter includes melted gas borne particles thereby forming an optically smooth surface.

12. The invention of claim 1, wherein the optical shutter is optically thin.

13. A diffuse reflecting and specularly transmitting optical shutter structure comprising an optically rough layer of optical shutter, and two layers having surfaces disposed on either side of the optical shutter with refractive indices defined to be within 0.20, the layer surfaces adjacent to the optical shutter conforming to the optically rough surfaces of the optical shutter and the non-adjacent layer surfaces to the optical shutter being optically smooth.

* * * * *